(12) United States Patent
Anand et al.

(10) Patent No.: US 8,087,022 B2
(45) Date of Patent: Dec. 27, 2011

(54) PREVENTION OF DEADLOCK IN A DISTRIBUTED COMPUTING ENVIRONMENT

(75) Inventors: Ashok Anand, Madison, WI (US); Manish Sethi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 11/945,712

(22) Filed: Nov. 27, 2007

(65) Prior Publication Data

US 2009/0138882 A1    May 28, 2009

(51) Int. Cl.
*G06F 9/46* (2006.01)

(52) U.S. Cl. ......... 718/102; 718/100; 718/101; 718/104

(58) Field of Classification Search .................... 718/102
See application file for complete search history.

(56) References Cited

U.S. PATENT DOCUMENTS

| | | | | |
|---|---|---|---|---|
| 5,991,792 | A * | 11/1999 | Nageswaran | 718/102 |
| 6,195,676 | B1 | 2/2001 | Spix et al. | |
| 6,898,617 | B2 | 5/2005 | Doolittle et al. | |
| 7,237,242 | B2 | 6/2007 | Blythe et al. | |
| 7,257,633 | B2 | 8/2007 | Masputra et al. | |
| 2003/0005172 | A1 * | 1/2003 | Chessell | 709/316 |
| 2004/0123293 | A1 | 6/2004 | Johnson | |
| 2006/0230409 | A1 * | 10/2006 | Frigo et al. | 718/108 |
| 2009/0113443 | A1 * | 4/2009 | Heller, Jr. et al. | 718/106 |

FOREIGN PATENT DOCUMENTS

WO    WO01/01256    1/2001

OTHER PUBLICATIONS

E.G. Coffman et al., "System Deadlocks," ACM Computing Surveys, Jun. 1971, pp. 67-78, vol. 3, No. 2.
F. Xiang et al., "Analysis of Interacting BPEL Web Services," Proceedings of the 13th International Conference on World Wide Web, May 2004, pp. 621-630.
D. Grove et al., "A Framework for Call Graph Construction Algorithms," ACM Transactions on Programming Languages and Systems, Nov. 2001, pp. 685-746, vol. 23, No. 6.
"IBM Tivoli Composite Application Manager for SOA," Tivoli Software, Nov. 2006, pp. 1-5.
"IBM Web Services Navigator," alphaWorks: IBM Web Services Navigator: Overview, Dec. 2004, 2 pages.

* cited by examiner

*Primary Examiner* — Kenneth Tang
(74) *Attorney, Agent, or Firm* — Ryan, Mason & Lewis, LLP (57) ABSTRACT

A system for preventing deadlock in a distributed computing system includes a memory and at least one processor coupled to the memory. The processor is operative: to receive as input a sorted set of containers defining a unique global sequence of containers for servicing process requests; to populate at least one table based at least in part on off-line analysis of call graphs defining corresponding transactions for a given order of the containers in the sorted set; to store within each container at least a portion of the at least one table; and to allocate one or more threads in a given container according to at least a portion of the at least one table stored within the given container.

1 Claim, 4 Drawing Sheets

FIG. 1

202 — ⊠ pre-method execution
204 — ☐ method execution
206 — ▨ pre-invoke out
208 — ▨ post-invoke out
210 — ▨ post-method execution

PREVENTION OF DEADLOCK IN A DISTRIBUTED COMPUTING ENVIRONMENT

CROSS-REFERENCE TO RELATED APPLICATION(S)

The present application is related to a commonly assigned U.S. application entitled "Prevention of Deadlock in a Distributed Computing Environment," identified by Ser. No. 11/945,648, and filed on even date herewith, the disclosure of which is incorporated by reference herein in its entirety.

FIELD OF THE INVENTION

The present invention relates to the electrical, electronic, and computer arts, and, more particularly, to techniques for preventing deadlock in a distributed computing environment.

BACKGROUND OF THE INVENTION

In a computing context, "deadlock" refers to a condition when two or more processes are each waiting for a resource held by another process, or when more than two processes are waiting for resources in a circular chain. Generally, only a process holding a resource may release the resource, and typically a process will not release the resource until processing has been completed.

Consider an enterprise service oriented architecture (SOA) environment, which can be seen as a set of web services deployed on middleware associated with a number of web service containers. One web service exposes a number of operations/methods and a method implementation may invoke one or more methods of other web services (often referred to as "nested calls"). A web service container typically hosts a number of web services and provides various resources that are necessary to process the requests made to the respective web service methods. Resources provided by the container are shared among processing of different requests to web service methods. A processing thread, or simply a "thread," is one such resource.

In prevalent design of web service containers, the web service container maintains a pool of threads, often referred to as a "thread pool." When a request for a web service method arrives at the container, it picks an available thread in the thread pool and allocates the thread to process the request. If there is no thread available in the thread pool, the request is added to a waiting queue. The allocated thread is not released until the processing of the request has been completed. When a thread is released back into the thread pool, it is allocated to a request waiting in the queue, if any, based on a prescribed queuing policy (e.g., first-in first-out (FIFO)).

Typically, an upper bound is kept on the number of threads in the thread pool. This upper bound is established for various performance reasons, including, but not limited to, the significant cost of the overhead associated with thread management. Due to the upper bound on the thread pool size, various scenarios in a distributed SOA environment can lead to distributed deadlock. These scenarios may include cases where no cycles are present at a service component layer. Consider the following illustrative scenario:

two web services containers, C1 and C2, each having an upper bound of one on the thread pool size.

Container C1 hosts two web services methods, $M_1$ and $M_{1-2}$. Container C2 hosts two web services methods, $M_2$ and $M_{2-1}$.

Implementation of method $M_{1-2}$ invokes method $M_2$, and implementation of method $M_{2-1}$ invokes method $M_1$.

Now consider a situation when container C1's thread and container C2's thread are allocated to web service requests for methods $M_{1-2}$ and $M_{2-1}$, respectively. During the processing of these methods, $M_{1-2}$ invokes method $M_2$, and method $M_{2-1}$ invokes method $M_1$, but none of these nested calls can be processed since, in both containers, all threads (one thread each) are busy and thus no threads are available for allocation to these requests. Furthermore, the threads will not be released by the ongoing requests processing methods $M_{1-2}$ and $M_{2-1}$ since completion of their respective processing is dependent on the completion of these nested calls. Accordingly, a deadlock situation arises. Even when the upper bound on the size of the thread pool is greater than one, such deadlocks can occur due to concurrent transactions.

The deadlock problem is not new in distributed systems and has been a subject of interest from theoretical as well as practical perspectives. However, in enterprise component middleware, deadlock was not observed as frequently, since a tiered architecture was the most common style of developing applications. As SOA becomes more widespread as an architecture style for reusing business functions in the form of web services and describing business processes in the form of composite services, there is a motivation to find efficient solutions for the deadlock problem.

In distributed systems, three major strategies that are applicable to handling deadlock are: deadlock prevention (e.g., designing offline resource requesting protocols); deadlock detection and recovery, which includes development of algorithms for detecting deadlock in a system and providing measures to bring the system back to a deadlock-free state; and deadlock avoidance, which includes development of online control policies that keep track of current resource allocation status, possibly combined with information about future process resource requirements, to keep the system away from deadlock states.

Conventional methodologies for deadlock detection and recovery generally involve maintaining a wait-graph of requests and preempting processes (e.g., removing a resource from a process) when deadlock is detected, which is undesirable. With regard to deadlock avoidance, one classic deadlock avoidance algorithm for non-distributed systems is the well-known Dijkstra's Banker's algorithm. However, for distributed systems, the general solution to distributed deadlock is impractical since it requires global atomic actions, or distributed synchronization.

Accordingly, there exists a need for deadlock prevention techniques that do not suffer from one or more of the limitations exhibited by conventional approaches.

SUMMARY OF THE INVENTION

Techniques of the present invention meet the above-noted need by preventing deadlock in an enterprise SOA environment. The invention takes advantage of a call graph that is available in SOA applications and exploits the reusable property of threads for handling loops in the call graph, thereby enhancing thread utilization efficiency. Embodiments of the invention achieve deadlock prevention by a combination of partially preempting the threads and partially avoiding a circular wait condition, a primary cause of deadlock. Moreover, resource preemption is beneficially achieved without significantly degrading system performance.

In accordance with one embodiment of the invention, a method of preventing deadlock in a distributed computing system includes the steps of: receiving as input a sorted set of containers defining a unique global sequence of containers for servicing process requests; populating at least one table based at least in part on off-line analysis of call graphs defining corresponding transactions for a given order of the containers in the sorted set; storing within each container at least a portion of the table; and allocating one or more threads in a given container according to at least a portion of the table stored within the given container.

In accordance with a further embodiment of the invention, a system is provided for preventing deadlock in a distributed computing system. The system includes a memory and at least one processor coupled to the memory. The processor is operative: to receive as input a sorted set of containers defining a unique global sequence of containers for servicing process requests; to populate at least one table based at least in part on off-line analysis of call graphs defining corresponding transactions for a given order of the containers in the sorted set; to store within each container at least a portion of the at least one table; and to allocate one or more threads in a given container according to at least a portion of the at least one table stored within the given container.

In accordance with yet a further embodiment of the invention, a computer program product is provided comprising a computer useable medium including computer usable program code for preventing deadlock in a distributed computing system. The computer program product includes: computer usable program code for receiving as input a sorted set of containers defining a unique global sequence of containers for servicing process requests; computer usable program code for populating at least one table based at least in part on off-line analysis of call graphs defining corresponding transactions for a given order of the containers in the sorted set; computer usable program code for storing within each container at least a portion of the at least one table; and computer usable program code for allocating one or more threads in a given container according to at least a portion of the at least one table stored within the given container.

These and other features, aspects, and advantages of the present invention will become apparent from the following detailed description of illustrative embodiments thereof, which is to be read in connection with the accompanying drawings.

DETAILED DESCRIPTION OF THE INVENTION

One or more embodiments of the invention provide techniques for preventing deadlock in an enterprise SOA environment. While reference may be made to specific illustrative algorithms and/or pseudo-code used in describing certain aspects of the invention, it is to be appreciated that the invention is not limited to these specific algorithms and/or pseudo-code, and that one skilled in the art given the teachings herein may propose modifications thereto that are within the scope of the present invention.

The phenomenon of deadlock has been studied extensively in the context of computer operating systems. For deadlock to occur among concurrent transactions, four conditions must be present: mutual exclusion (i.e., tasks claim exclusive control of the resources they require), hold-and-wait (i.e., tasks hold resources already allocated to them while waiting for additional resources), no preemption (i.e., resources cannot be forcibly removed from the tasks holding them until the resources are used to completion), and circular wait (i.e., a circular chain of tasks exists, such that each task holds one or more resources that are being requested by the next task in the chain). These conditions are sometimes referred to as Coffman conditions, from their first description in the text by E. G. Coffman, et al., "System Deadlocks," *ACM Computing Surveys*, Vol. 3, No. 2, pp. 67-78 (1971), which is incorporated by reference herein. All of these four conditions must be present for deadlock to occur and if one of these conditions is removed, deadlock will not occur.

Techniques of the present invention achieve deadlock prevention by removing one or more of the above-noted necessary conditions. For example, in accordance with an illustrative aspect of the invention, deadlock prevention is achieved by eliminating a circular wait condition. In accordance with a further aspect of the invention, a non-preemption condition is selectively removed, for efficiency, in cases where a transaction visits a particular container more than once during the course of execution of, for example, nested calls. Resource preemption can be achieved without significantly degrading system performance by exploiting a salient property of a specific resource, namely, a thread. The term "thread" as used herein is intended to refer to an execution context, a resource necessary to run a computation. A thread can be preempted from a call and allocated to essentially any multi-level nested call that arrives to the same container, without any adverse effect on the enclosing call, since unless the nested call is processed, the enclosing call cannot proceed with its processing anyway.

Removing the no preemption condition can be accomplished by allocating one thread per transaction per container at any given time. Each time the transaction revisits the container during a given request, due to the execution of a nested call, the same thread is used for executing the request. For removing the circular wait condition, an on-demand thread reservation technique is preferably employed for selective calls in such a manner that for all transactions, threads are allocated in different containers, to distributed transactions, in a predetermined order of containers, which may be referred to herein as a global containers sequence, irrespective of the order in which transactions visit the containers. Using this methodology, only some calls of selective transactions may require thread reservation.

The illustrative deadlock prevention methodology according to an embodiment of the invention assumes knowledge of interactions among web services hosted on containers. There are numerous techniques and tools that can be used to derive this knowledge, as will become apparent to those skilled in the art given the teachings herein. By way of example only and without limitation, static analysis techniques, as described, for example, in F. Xiang, F., et al., "Analysis of Interacting BPEL Web Services," *Proceedings of the 13th*

*International Conference on World Wide Web*, pp. 621-630 (2004), and D. Grove, et al., "A Framework for Call Graph Construction Algorithms," *ACM Transactions on Programming Languages and Systems*, Vol. 23, pp. 685-746 (2001), the disclosures of which are incorporated by reference herein, run time monitoring techniques (e.g., IBM Tivoli Composite Application Manager for SOA, and IBM Web Services Navigator), or a combination of static analysis and run time monitoring techniques, can be used to derive knowledge regarding the interaction among web services.

Embodiments of the invention perform an off-line analysis of call graphs of each of the web services methods and provide each container with some essential local information. A "call graph" (sometimes referred to as a call multigraph) is a directed graph that represents a calling relationship among subroutines, or among other sub-processes, in a computer program. The call graph includes certain information about the program's control flow and it can be at least partially determined statically. However, the call graph is typically a nondeterministic entity, since branch execution is decided at run time. At run time, containers use the local information provided by the call graphs for employing the two techniques discussed above, preferably without consulting any central point or each other. Moreover, no complex computation is required at run time in containers, as the local information is stored in the form of a map and only a few map operations are performed that can be achieved in constant time.

A SOA enterprise environment can be modeled as a tuple (C, G) including a set of web services containers C: $\{C_1, C_2 \ldots C_N\}$ and a set of call graphs G: $\{G_1, G_2, \ldots G_N\}$, where $G_i$ represents a call graph for a web service method hosted on container $C_j$. A call graph is a finite tree including a plurality of execution nodes. An execution node can be represented as a tuple (M, C), where M is a web service method that executes in container C. A uniquely labeled edge from $(M_x, C_x)$ to $(M_y, C_y)$ denotes that method $M_x$, while executing in container $C_x$, invokes method $M_y$ in container $C_y$ synchronously, where x and y are two different integers. Call graphs are modeled for those web service methods whose call can be originated from an entity outside the set of containers, such as, for instance, an external web service client. A "transaction" can be defined herein as a running instance of a call graph corresponding to a web service method. A "transaction type" may be defined herein as a unique identifier for a call graph. An edge container, in the context of a transaction, is the container C corresponding to root node (M, C) of a call graph of the transaction. A "flow" may be defined as a path from a root node to a leaf node in the call graph.

In a call graph, "OR nodes" can be introduced to handle mutual exclusion. OR nodes are preferably defined herein as having more than one child node. Only one of the child nodes of an OR-node will be executed for a given transaction, based on a condition determined at run time. Likewise, "AND nodes" can be introduced to handle parallelism. AND nodes are preferably defined herein having more than one child node. All the child nodes of an AND node will be executed concurrently. An edge from an execution node (M, C) to an AND/OR node preferably denotes that method M, in the course of execution, invokes methods indicated by the execution node children of the AND/OR nodes. OR nodes in the call graph represent the scenario of choosing one of the competing services; AND nodes in the call graph represent the scenario of parallel processing. Both scenarios, namely, choosing one of the competing services and parallel processing, are frequently observed in composite services in a SOA enterprise environment.

Leaf nodes and a root node in the call graph are preferably always of kind execution nodes. An execution node can have children of any node type while AND/OR nodes cannot have children of their own type. The order of execution of children nodes of an execution node may be represented as a left-to-right order of children nodes.

Tuple $(M_z, C_w)$ may be used to represent a nested call of $(M_x, C_y)$ when $(M_x, C_y)$ is an ancestor of $(M_z, C_w)$ in a call graph. There may be said to be a loop at node $(M_x, C_y)$ when the node has a nested call $(M_z, C_w)$, such that $C_y = C_w$.

Figure 1:
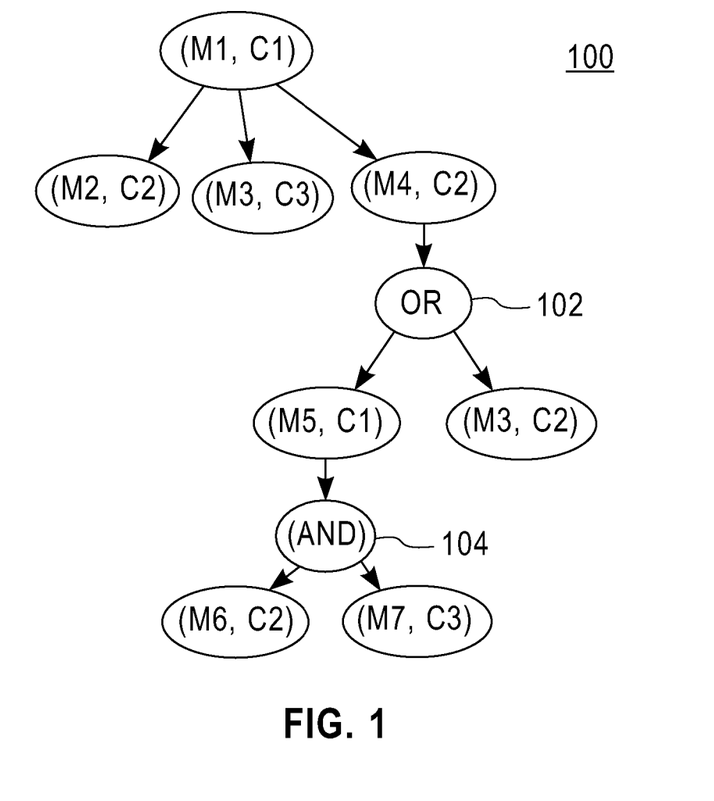
FIG. 1 illustrates an exemplary call graph which may be used in performing at least a portion of a deadlock prevention methodology, in accordance with an aspect of the invention.

Attention should now be given to FIG. 1, which shows an exemplary call graph 100 which may be used in performing at least a portion of a deadlock prevention methodology, in accordance with an aspect of the invention. As apparent from call graph 100, container C1 hosts methods M1 and M5, container C2 hosts methods M2, M3, M4 and M6, and container C3 hosts methods M3 and M7. Method M1 first invokes method M2 in container C2 and receives a reply from M2. Then, method M1 invokes method M3 in container C3 and, after receiving a reply from M3, invokes method M4 in container C2. During execution of method M4, either method M5 is invoked in container C1, or method M3 is invoked in container C2 via OR node 102. During execution, method M5 concurrently invokes methods M6 and method M7 via AND node 104. In call graph 100, a call to method M5 is essentially a nested call of methods M4 and M1, and there are some loops present, such as, for example, along a path represented by (M1, C1)→(M4, C2)→(OR)→(M5, C1). Call graphs similar to call graph 100 may be observed, for instance, in a composite SOA environment, where a web service is implemented using Business Process Execution Language (BPEL) including fork, join and/or branching constructs.

An illustrative model defining a process of handling a call for a method by a hosting container will now be described. The process of handling a call is preferably categorized into a plurality of phases, including a pre-method execution phase, a method execution phase, a pre-invoke out phase, a post-invoke out phase, and a post-method execution phase. It is to be understood, however, that the invention is not limited to the specific number and/or type of phases described herein.

Figure 2:
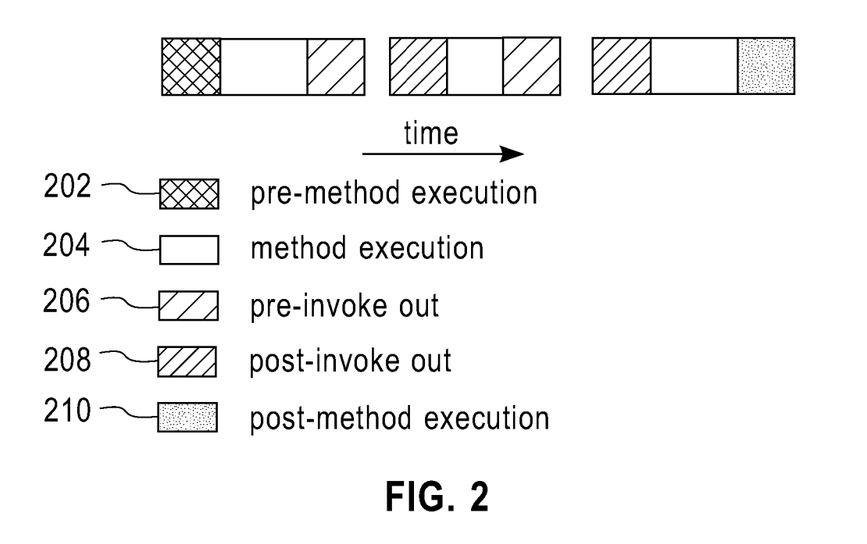
FIG. 2 illustrates an exemplary placement of each of a plurality of phases of call handling by a container, according to another aspect of the invention.

FIG. 2 illustrates an exemplary placement of each of the above-identified phases of call handling by a container, in accordance with an aspect of the invention. The pre-method execution phase 202 and post-method execution phase 210 represent processing wherein the container allocates and de-allocates, respectively, a thread for executing a given web service method. The method execution phase 204 represents the processing of actual implementation code corresponding to the web service. During the method execution phase, method implementation may invoke other web services. The pre-invoke out phase 206 and post-invoke out phase 208 correspond to invocation of another web service and getting a corresponding reply, respectively, from within the web service implementation code.

In all the phases except the method execution phase, the container code is executed; during the method execution phase, the control of the thread resides with the implementation code of the web service. Transfer of control between container code and web service implementation code is achieved via standardized application programming interface (API) invocations.

Ordered Distributed Containers Thread Allocation Methodology

An exemplary methodology, referred to herein as an ordered distributed containers thread allocation (ODCTA) methodology, will now be described according to one embodiment of the invention. First, an illustrative case for handling a simple call graph that does not contain any AND/OR nodes will be considered. This simple case can then be extended, in accordance with other aspects of the invention, to handle more complex call graphs which incorporate AND/OR nodes as well, using the teachings set forth herein. It is to be understood that the ODCTA methodology is merely illustrative, and that other techniques for achieving the advantages and objectives of the invention are similarly contemplated.

In the exemplary ODCTA methodology, each container maintains three tables, namely, an allocation table, a reservation table and a commanding table. The following definitions will be used in connection with these tables:

Allocation table {transaction id, thread id}: An example entry [txid, thid] into this table means that a thread with id thid is allocated to a transaction with id txid.

Reservation table {transaction id, thread id, reservation counter}: An example entry [txid, thid, num] into this table means that a thread with id thid is reserved for a transaction with transaction id txid, with value of reservation counter as num.

Commanding table {transaction type, E, CR}: An example entry [tx-type, E1, CR={$(C_1, 1), (C_2, 2)$}] into this table at container C means that before allocating a thread to a transaction of type tx-type, when the transaction visits the container following edge E in the call graph of transaction type tx-type, C requests container $C_1$ and container $C_2$ to reserve a thread for the transaction. The reservation count is 1 for container $C_1$ and 2 for container $C_2$, in this example.

The entries in the allocation table and the reservation table preferably keep updating at run time, while entries in the commanding table are populated statically by off-line analysis of all distinct call graphs.

In accordance with the exemplary ODCTA methodology, when a request arrives for execution of a method M of web-service hosted on a container C, the following steps are initiated:

Pre-Method Execution Phase

Figure 3:
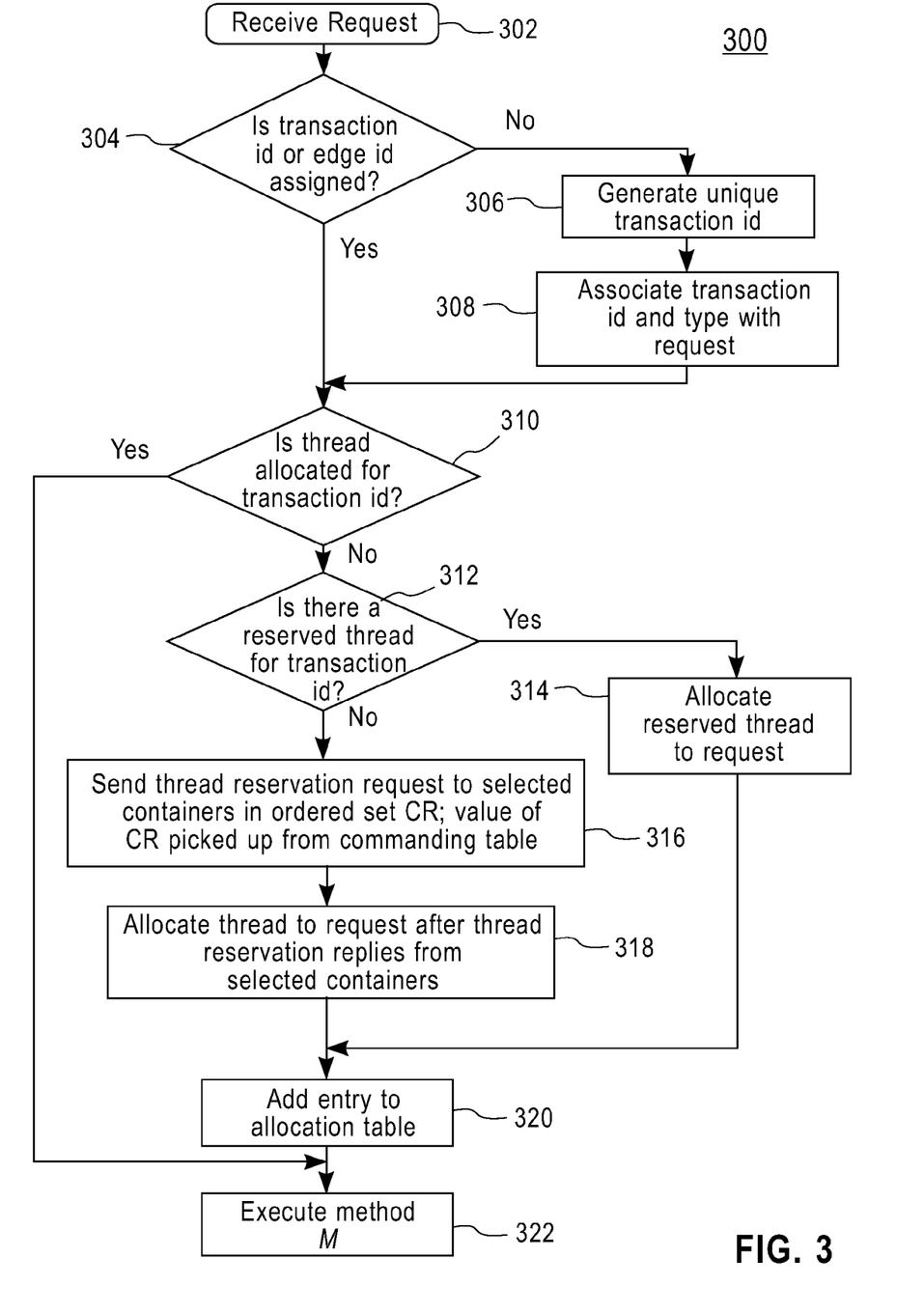
FIG. 3 is a process flow diagram depicting an exemplary method performed during a pre-method execution phase of an ordered distributed containers thread allocation (ODCTA) methodology, in accordance with an aspect of the invention.

FIG. 3 is a process flow diagram depicting an exemplary method 300 performed during a pre-method execution phase of the ODCTA methodology, in accordance with an aspect of the invention. Method 300 will be described in further detail below with reference to FIG. 3. During the pre-method execution phase, upon receiving a request in block 302:

(a) In block 304, the container C checks for a transaction id and edge id associated with the request. When there is no such identifier, process flow proceeds to block 306, where the container assumes itself to be an edge container for the transaction and generates a globally unique transaction id. The container then associates the unique transaction id and a transaction type with the request in block 308.

(b) The container, whether an edge container or otherwise, then checks whether a thread has already been allocated or reserved for this transaction id. The container may determine this by looking for a transaction id entry in the allocation table and the reservation table, respectively. Block 310 checks to see whether a thread has been allocated, and if not, block 312 checks to see whether a thread has been reserved.

i. When block 310 determines that a thread has already been allocated, the container C exits the pre-method execution phase and uses the allocated thread to execute the method M in block 322. An objective of this step is to reuse the thread in the case of a loop in the transaction by preempting the thread from an enclosing call and allocating it to a nested call. This does not affect the overall performance because the response to the enclosing call that the thread waits for would not arrive at the container until the nested call is processed completely, due to a new call being a nested call in the same transaction from the perspective of an earlier call. This mechanism ensures that the container does not allocate more than one thread for the same transaction at any given point in time.

ii. When a thread has not already been allocated but block 312 determines that there is a reserved thread for the transaction, the container C allocates the reserved thread to the request in block 314.

iii. When there is neither an already allocated thread nor a reserved thread for the transaction, process flow continues to block 316, where the container C first sends a thread reservation request to one or more other selected containers that appear in a prescribed (e.g., pre-computed) ordered set CR; container C obtains CR by looking into the commanding table for an entry for the transaction type associated with the transaction. These thread reservation requests are sent one after another in the order of appearance of the containers in ordered set CR. For example, a request to container $C_2$ is sent after a reply from container $C_1$ arrives, if $C_1$ precedes $C_2$ in the ordered set CR.

The commanding table in each container may be populated by offline computation, such as, for example, by an out-of-order reservation (OoOR) algorithm, which will be described in further detail herein below. Alternative methodologies for populating the commanding table may also be employed, as will become apparent to those skilled in the art given the teachings herein. One objective of the OoOR algorithm is to perform an analysis of all distinct call graphs and populate the maps in substantially all the containers such that the order of containers allocating the thread, for any transaction, is always a sub-sequence of a prescribed order of containers (e.g., global containers sequence). A thread reservation request preferably comprises two parameters: a transaction id; and an integer reservation counter. On receiving a thread reservation request, each container in the ordered set CR reserves a thread for the transaction and puts a corresponding entry into its reservation table and then sends a thread reservation reply back to container C.

(c) After container C receives thread reservation replies from the respective containers present in the ordered set CR, the container, in block 318, allocates a thread for execution of method M by following the mechanism existing in prevalent designs of containers described herein above. The container C also adds a corresponding entry into its allocation table indicating that the thread has been allocated in block 320 before exiting the pre-method execution phase and executing the method M in block 322.

Pre-Invoke Out Phase

During the pre-invoke out phase, the container C associates a transaction id, a transaction type, and an edge id with the web service request that it goes out to, as a consequence of invoking the nested call.

Post-Method Execution Phase

Figure 4:
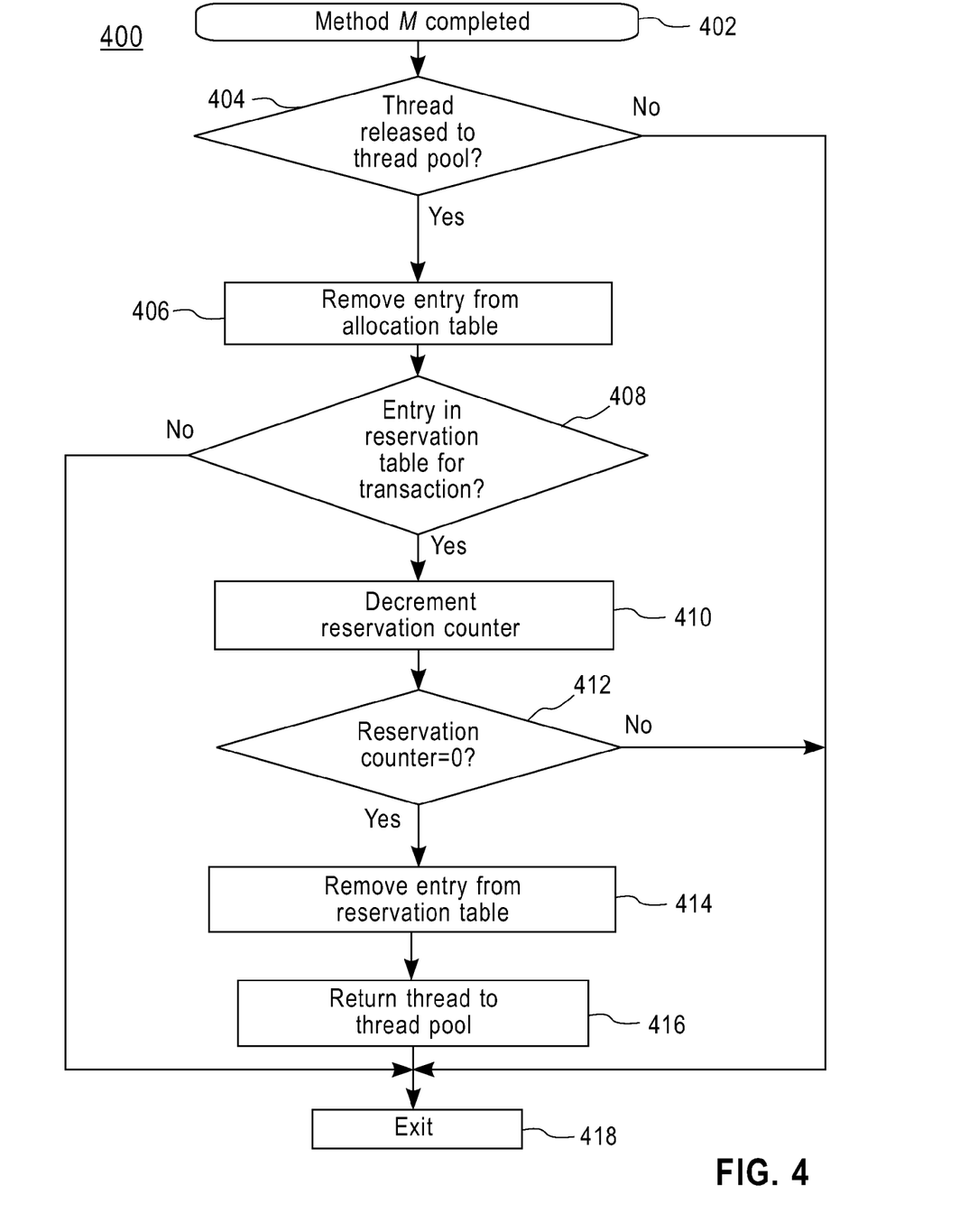
FIG. 4 is a process flow diagram depicting an exemplary method performed during a post-method execution phase of the ODCTA methodology, in accordance with an aspect of the invention.

FIG. 4 is a process flow diagram depicting an exemplary method 400 performed during a post-method execution phase of the ODCTA methodology, in accordance with an aspect of the invention. Method 400 will be described in further detail below with reference to FIG. 4. During the post-method execution phase, after completion of method M execution in block 402:

(a) if the thread is automatically released back to the thread pool, as determined in block 404, the corresponding entry from the allocation table is removed in block 406. This might happen, for example, when the completing method is the one to which the thread was allocated from the thread pool, not by preempting from an enclosing request. If, after execution of method M, the thread is not released back to the thread pool, method 400 exits at block 418.

(b) if the entry in the allocation table is removed in block 406, the container C, in block 408, determines whether there is a corresponding entry for the transaction in the reservation table. When there is an entry for the transaction in the reservation table, the value of the reservation counter is decremented in block 410, preferably by one, although alternative counting schemes are contemplated. When there is no entry in the reservation table for the transaction, method 400 exits at block 418. The value of the reservation counter is then checked in block 412.

(c) when, in block 412, it is determined that the value of the reservation counter corresponding to the entry for the transaction in the reservation table becomes zero, the entry is removed from the reservation table in block 414 and the thread is returned back to the thread pool in block 416, after which the post-method execution phase is exited in block 418. When the reservation counter is not equal to zero, as determined in block 412, method 400 exits at block 418.

Using the illustrative ODCTA methodology described above, deadlock prevention is achieved. As proof of this, consider the following. In ODCTA, thread reservation requests are sent by a participating container in such a way that for each transaction, the thread allocation follows a global container sequence. Since the global container sequence is unique by definition, for all transactions, no cyclic dependencies arise. Hence, ODCTA achieves deadlock freedom.

OoOR Algorithm

In conjunction with an implementation of the ODCTA methodology, the commanding tables of each of the containers can be populated by offline computation, as previously stated. An exemplary methodology for populating the respective commanding tables using OoOR will now be described for a given global container sequence, according to a further aspect of the invention. The methodology is preferably applied to all the call graphs independently. It is to be appreciated that alternative methodologies for populating the commanding tables may also be employed, in accordance with other embodiments of the invention.

Given a call graph G and a corresponding global container sequence S, the methodology computes set CR(C) for an entry {tx-type, CR(C)} in a commanding table of container C, where tx-type is the transaction type for call graph G. An ordering relation ">" is defined between containers $C_1$ and $C_2$, such that $C_1 > C_2$, if $C_1$ comes before $C_2$ in the global container sequence. An ordering relation ">" is also defined between nodes $(M_1, C_1)$ and $(M_2, C_2)$ in a call graph, such that $(M_1, C_1) > (M_2, C_2)$ if $(M_1, C_1)$ is an ancestor of $(M_2, C_2)$ in the call graph (i.e., a call to method $M_2$ is a nested call from method $M_1$).

First, all flows $(F_1, F_2 \ldots F_n)$ present in the call graph are computed. For every node (M, C) in flow $F_i$ (where i is an integer), a set OoO((M, C), $F_i$) is computed. This set preferably contains only those nodes $(M_x, C_x)$ of the flow $F_i$ such that, for $(M, C) > (M_x, C_x)$ and $C_x > C$, the set OoO((M, C), $F_i$) can be computed according to the expression:

$$OoO((M,C),F_i) = \{(M_x, C_x) | (M_x, C_x) \in F_i, (M,C) > (M_x, C_x), C_x > C\}.$$

The significance of set OoO((M, C), $F_i$) is that it includes all nodes $(M_x, C_x)$ such that a thread is allocated at container $C_x$ before a thread allocated at container C. The order of containers allocating the thread to the flow is therefore always a subsequence of the global container sequence.

Next, for every node (M, C) in flow $F_i$, set RT((M, C), $F_i$) is computed. This set includes the containers to whom container C will send thread reservation requests before allocating a thread to the flow. For computing set RT((M, C), $F_i$), nodes of flow $F_i$ are traversed from root node to leaf node. As the nodes of flow $F_i$ are traversed, the containers to which the thread reservation requests are to be sent are kept track of (e.g., recorded) in a temporary set, TempRes($F_i$). For each new node (M, C) visited, the set RT((M, C), $F_i$) is preferably computed as including only those containers of set OoO((M, C), $F_i$) for which a thread reservation request will not be sent. This may be represented by the expression:

$$RT((M,C),F_i) = \{C_x | (M_x, C_x) \in OoO((M,C),F_i)\} - TempRes(F_i).$$

The temporary set TempRes($F_i$) is updated by adding new RT((M, C), Fi) and C to TempRes($F_i$). This is done primarily because if an ancestor node in the flow has decided to send the thread reservation request to a particular container, the descendent node need not also send the thread reservation request. Exemplary pseudo-code for computing all values of the set RT((M, C), $F_i$) is shown below, in accordance with an embodiment of the invention.

```
algorithm OoO
    For every node (M, C) and flow F_i, compute OoO((M, C), F_i)
    For flow f in F_1, F_2 ... F_x
        TempRes = ∅
        For node (M, C) in (M_1, C_1), (M_2, C_2), ... (M_y, C_y) of flow f
            RT((M, C),f) ← { C_x | ( M_x, C_x) ∈ OoO((M, C), f)} - TempRes
            TempRes ← TempRes ∪ RT((M, C), f)
        end - For
    end - For
end algorithm
```

The computation of the set CR(C) from all values of RT((M, C), $F_i$) is relatively straight forward. In an illustrative embodiment, set CR(C) can be computed as follows:

1. If an incoming edge to node (M, C) belongs to only one flow $F_i$, set CR(C) is populated by the containers belonging to set RT((M, C), $F_i$). The thread reservation count in this illustrative case is one for each container entry. The ordering of containers in set CR(C) is preferably configured to follow the ordering of the global container sequence.

2. If an incoming edge to node (M, C) belongs to more than one flow, set CR(C) is populated by combining all containers belonging to set RT((M, C), $F_i$) of all such flows. In this aggregated set, each occurrence of that container $C_x$ is replaced by adding entry ($C_x$, # occurrence) to set CR(C). Once again, the ordering of containers in set CR(C) is configured to follow the ordering of the global container sequence.

Extension of the ODCTA Methodology for Handling Complex Transactions

As will be described herein below, the ODCTA methodology can be utilized to handle complex transactions (e.g., transactions whose corresponding call graphs include AND nodes and/or OR nodes), in accordance with a further aspect of the invention. By way of example only, first, during off-line processing of a call graph corresponding to a given transaction, all AND nodes are preferably removed, one by one, in a depth-first manner. More particularly, in removing an AND node, one of the sub-trees in the call graph is moved to the parent node while the rest of the sub-trees are treated as distinct call graphs. If a root node of a separated sub-tree is an OR node, the OR node is removed and all sub-trees associated therewith are treated as distinct call graphs. The rational for treating all but one of the sub-trees of an AND node as a distinct call graph is that in containers an extra thread per parallel branch is allocated for handling a concurrency. Moreover, all descendent execution nodes require a separate thread in their hosting container in order to maintain the concurrency.

After removing the AND nodes in the call graph, only distinct call graphs remain, each distinct call graph including execution nodes and/or OR nodes. By introducing one more tables that each container C maintains, namely, a release commanding table, the ODCTA methodology can be extended to handle OR nodes. Each entry in the release commanding table is preferably of the type {tx-type, E1, $C_2$}, where in the post-invoke out phase for a transaction of type tx-type for an out-going call corresponding to edge E1, container C sends a thread release request to container $C_2$. Upon receiving a thread release request for a transaction type, container $C_2$ decreases the reservation counter by one in the reservation table. The rational behind this is that as soon as it is known at run time which one out of multiple child nodes of an OR node is to be invoked, the threads that were reserved for other paths can be released. The entries for the release commanding table are populated at the time of off-line analysis. One exemplary methodology for populating entries in the release commanding table is shown below in pseudo-code, in accordance with an illustrative embodiment of the invention. The exemplary methodology uses ordered set CR for a node (M, C) in the call graph described above.

```
algorithm ReleaseCommandingTable Population
    For each C_i in CR associated with node (M, C)
        For each (X, C_j) node, where (X, C_j) is descendent of (M, C), and not
        descendent of any (Y, C_j) node
            For each OR node ON in path P from node (X, C_j) to node (M, C)
                For each outgoing edge E of ON, such that E is not in P
                    Add entry {tx-type, E, C_j} into release commanding table of C
end-algorithm
```

As previously stated, salient tasks of the ODCTA methodology can be implemented in a SOA environment. One such task is the generation of various identifiers at the time of off-line analysis for populating the commanding and release commanding tables. By way of example only, the designation M.C can be used as a unique identifier for a transaction type of a call graph, where (M, C) is a root node of the call graph. For assigning a unique identifier to an edge inward to node (M, C) in the call graph, we traverse a path from the root node to the node (M, C) and compute the identifier by concatenating method names of nodes visited along the path, separated by ".".

At run time, the propagation of identifiers with a transaction can be achieved by adding a special purpose simple object access protocol (SOAP) header to outgoing web services request messages. The edge container preferably associates an appropriate transaction type, an empty edge id, and a unique transaction id (e.g., globally unique random number) with the incoming request, in the pre-method processing phase. All containers, including the edge container, pass the identifiers associated with the incoming request (e.g., transaction id, transaction type, and edge id), along with the service request for the nested calls going out to a node (M, C) in the pre-invoke out phase, although the edge id is modified by appending .M in the process. All containers use the transaction id, transaction type, and edge id associated with an incoming request for making thread allocation decisions in accordance with the illustrative ODCTA methodology described above.

Data structures may be used for maintaining the local information at each container and operations for using and updating the data structures, as discussed in connection with the ODCTA methodology, will become to those skilled in the art given the teachings herein. Consequently, operations for updating the data structures will not be presented in further detail herein. Moreover, techniques of the present invention described herein may be implemented across heterogeneous container implementations.

From a thread utilization perspective, in accordance with an illustrative embodiment of the invention, a thread is reserved only when the global container sequence has been violated. From a communication cost perspective, there is a considerable cost associated with sending a thread reservation message and receiving a reply. Accordingly, the global container sequence is an important parameter of the ODCTA methodology. Preferably, the global container sequence is selected such that for most frequent transactions, the number of thread reservation requests is relatively small. In this manner, communication costs associated with sending and receiving thread reservation requests can be significantly minimized while maintaining efficient thread utilization.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 5:
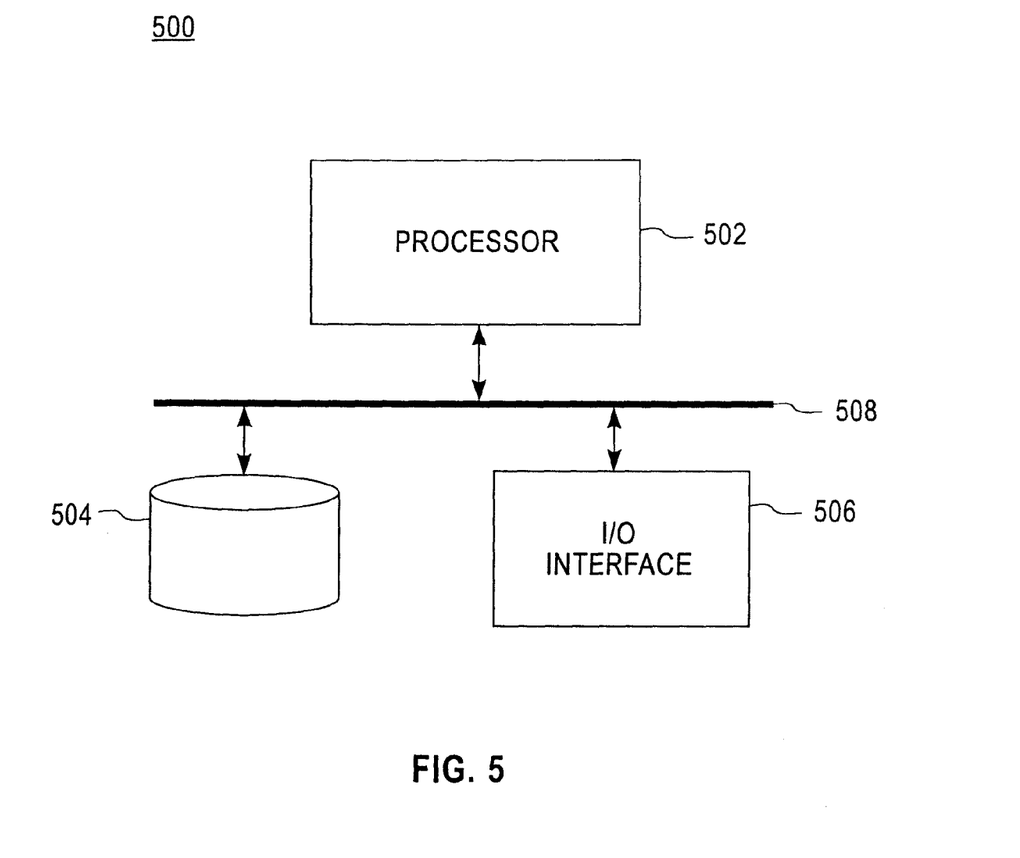
FIG. 5 depicts a computer system that may be useful in implementing one or more aspects and/or elements of the present invention.

One or more embodiments can make use of software running on a general purpose computer or workstation. With reference to FIG. 5, such an implementation might employ, for example, a processor 502, a memory 504, and an input/output (I/O) interface 506 formed, for example, by a display and a keyboard (not explicitly shown). The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and I/O interface 506 can be interconnected, for example, via bus 508 as part of a data processing unit 500. Suitable interconnections, for example via bus 508, can also be provided to a network interface (not explicitly shown), such as a network card, which can be provided to interface with a computer network, and to a media interface, such as a diskette or CD-ROM drive, which can be provided to interface with media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 504), magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system, preferably a data processing system, suitable for storing and/or executing program code will include at least one processor 502 coupled directly or indirectly to memory elements 504 through a system bus 508. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, and the like) can be coupled to the system either directly (such as via bus 508) or through intervening I/O controllers (omitted for clarity).

Network adapters such as network interface (not explicitly shown) may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system for preventing deadlock in a distributed computing system, the apparatus comprising:
   a memory storing an allocation table for maintaining at least a transaction identifier and a thread identifier for a given allocated thread, a reservation table for maintaining at least a transaction identifier and a reservation counter for a given reserved thread, and a table for maintaining at least a transaction type; and
   at least one processor coupled to the memory and programmed to implement the following steps: (i) receiving as input a sorted set of containers defining a unique global sequence of containers for servicing process requests; (ii) populating at least one table based at least in part on off-line analysis of call graphs defining corresponding transactions for a given order of the containers in the sorted set, a portion of the call graphs specifying at least one path taken by a given transaction between two or more containers and a number of threads to reserve in each container specified by the given transaction, the at least one table comprising local information such that at run time each container uses the local information, without accessing a central point in the system and without accessing another container, for making decisions related to at least one of preemption, reservation, allocation and de-allocation of resources used for servicing the process requests; (iii) storing within each container at least a portion of the at least one table; (iv) allocating one or more threads in a given container according to at least a portion of the at least one table stored within the given container; (v) changing a thread allocation order in the container for each transaction to correspond to the global sequence of containers, without changing a sequence of transaction processing in the containers; (vi) associating a unique identifier and transaction type with each of the transactions; when a loop is detected in a single transaction corresponding to the unique identifier, to reuse a thread already allocated to the transaction in the container; and to determine whether to reserve a thread for the transaction or to release a thread from the transaction as a function of the unique identifier associated with the transaction; (vii) upon receiving a process request corresponding to a transaction, determining whether a unique identifier has been assigned to the request; when a unique identifier has not been assigned to the request, to generate a unique identifier and assigning the identifier and a transaction type to the request; (viii) determining whether a thread is allocated for the transaction corresponding to the identifier; (ix) when a thread has not been allocated for the transaction, determining whether a thread is reserved for the transaction corresponding to the identifier; (x) when a thread is not reserved for the transaction, sending a thread reservation request to at least one selected container in the sorted set of containers and to allocate a thread to the process request based at least in part on at least one reservation reply from the at least one selected container; (xi) when a thread is reserved for the transaction, allocating the reserved thread to the process request; and to add an entry to an allocation table corresponding to the at least one selected container, the entry indicating that a thread has been allocated to the transaction corresponding to the identifier; (xii) after processing a method corresponding to a transaction associated with the given container, determining whether a thread used to process the method corresponding to the transaction has been released back to a thread pool maintained by the container; (xiii) when the thread has been released back to the thread pool, removing an entry from an allocation table associated with the container, the entry corresponding to the transaction; to determine whether there is a corresponding entry for the transaction in a reservation table associated with the container; (xiv) when there is a corresponding entry for the transaction in the reservation table, decrementing a counter, the counter being used to track a number of entries corresponding to the transaction in the reservation table; and (xv) when the counter has a value of zero, removing the entry corresponding to the transaction in the reservation table and to return the thread to the thread pool.

* * * * *